United States Patent [19]

Engel et al.

[11] 4,186,431

[45] Jan. 29, 1980

[54] LINEAR LIGHT SOURCE

[75] Inventors: Joseph C. Engel, Monroeville; George Hines, Pittsburgh, both of Pa.

[73] Assignee: Westinghouse Electric Corp., Pittsburgh, Pa.

[21] Appl. No.: 900,945

[22] Filed: Apr. 28, 1978

[51] Int. Cl.² ................................................ F21S 3/00
[52] U.S. Cl. .................................... 362/223; 362/255; 362/307; 362/347; 362/361
[58] Field of Search ............... 362/255, 361, 223, 359, 362/347, 217, 341, 307

[56] References Cited

U.S. PATENT DOCUMENTS 3,115,309  12/1963  Spencer et al. ...................... 362/217

Primary Examiner—Stephen J. Lechert, Jr.
Attorney, Agent, or Firm—M. P. Lynch

[57] ABSTRACT

A cylindrical, elongated incandescent lamp is positioned within a tubular light reflecting member including a line light diffuser strip window. The light reflecting member responds to the electrical excitation of the incandescent lamp by emitting a light pattern through the line light diffuser strip window.

9 Claims, 6 Drawing Figures

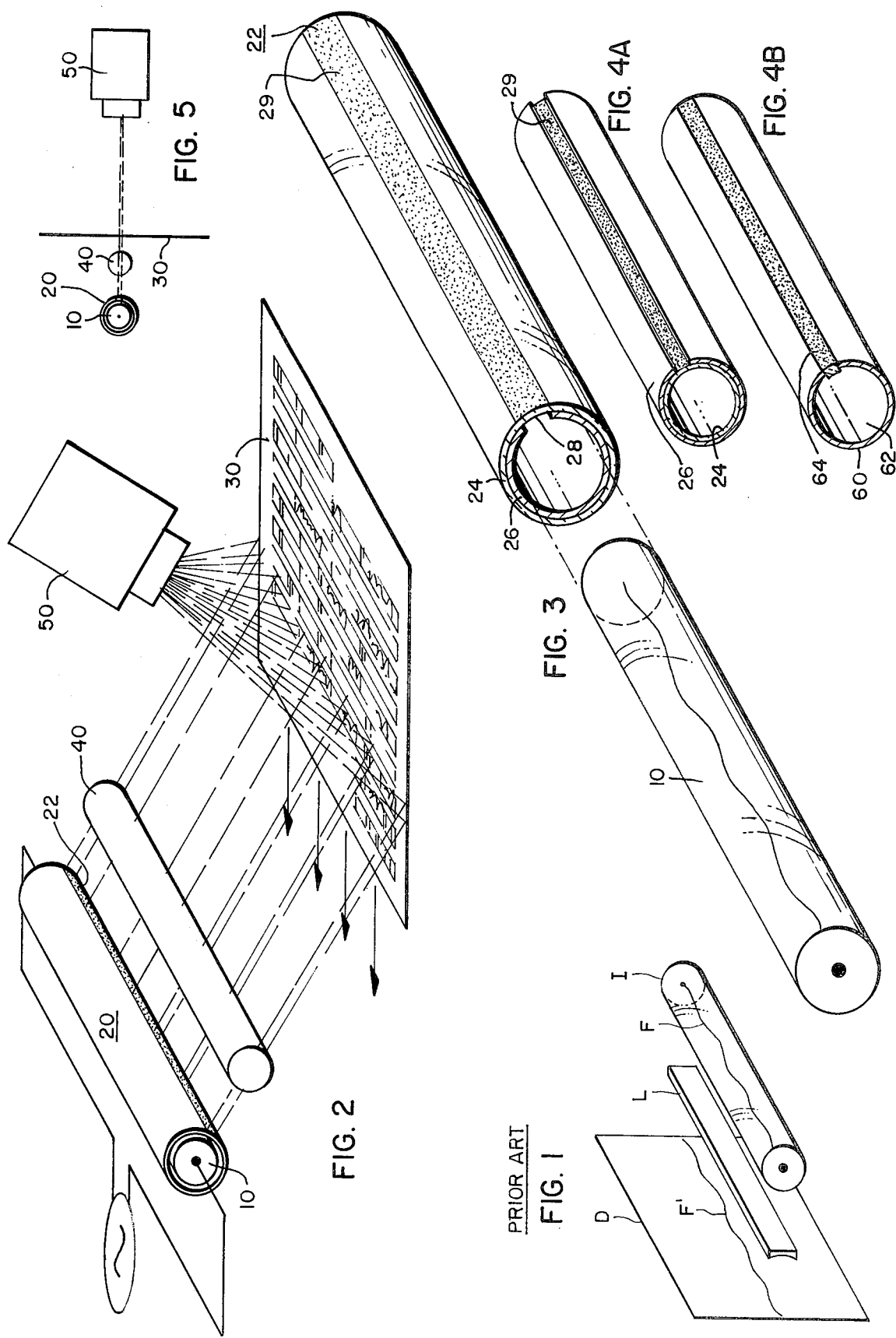

LINEAR LIGHT SOURCE

BACKGROUND OF THE INVENTION

Document reading or scanning machines which are designed to optically read data from a sheet of paper commonly utilize a linear light source to project a narrow band of light across the document to be read. These optical scanning or data reading machines have found wide spread use in check reading, ballot counting, dollar changing and test scoring applications. Typically, the optical reading machine utilizes an array of light sensitive detectors, such as photo-transistors, photo-diodes, charge coupled devices, etc., to measure the amount of light reflected from or transmitted through the document. The areas of the document which contain ink or carbon penciled characters or marks will absorb light and thus will appear as dark areas to the photo-detecting elements.

In order to assure the accuracy of the optical reading machine, the light source must produce an intense, uniform light distribution across the document. Further, since the light detecting elements comprising the light sensing array, are normally silicon devices which are most sensitive to light with a wavelength centered about 1,000 nanometers, it is particularly desirable for the wavelength of the light source to be in the near infrared region.

While the conventional incandescent lamps exhibit the proper wavelength, the filament of a cylindrical elongated incandescent lamp is neither straight nor concentric and exhibits filament sag and other manufacturing alignment limitations. The utilization of such a lamp will result in the projection of the irregular filament image onto the document thus severely reducing the resolution and accuracy of the optical reading machine.

SUMMARY OF THE INVENTION

There is described herein with reference to the accompanying drawings a technique for utilizing conventional, low cost, long lived cylindrical elongated incandescent lamps to produce a uniform, linear line illumination of a document for either a light reflective system or a light transmission system. The conventional cylindrical, elongated incandescent lamp is positioned within a tubular, cylindrical light reflecting element, such as a glass cylinder having a reflective coating disposed on either the outside or inside surface, and having a light diffuser window corresponding to the desired light emission pattern to be projected onto the document. The above combination results in the emission of a uniform light pattern through the light diffuser window without the projection of the image of the irregular filament of the incandescent lamp.

DESCRIPTION OF THE DRAWINGS

The invention will become more readily apparent from the following exemplary description in connection with the accompanying drawings:

FIG. 1 is a schematic illustration of a Prior Art light source for illuminating a document for use in combination with an optical reading machine;

FIG. 2 is a schematic illustration of the novel uniform light source as employed in combination with an optical reading machine in light reflective system;

FIG. 3 is an exploded detailed illustration of novel light source of FIG. 2;

FIGS. 4A and 4B are pictorial illustrations of an alternate embodiment of the novel light source of FIG. 3; and FIG. 5 is an illustration of the novel light source in a light transmission system.

DESCRIPTION OF THE PREFERRED EMBODIMENT

Referring to FIG. 1, there is illustrated a Prior Art combination of an elongated incandescent lamp I including the typical irregular filament element F which is neither straight nor concentrically disposed within the lamp I and a lens L which functions to project a light pattern corresponding to the filament image F' onto a document D. In a conventional document format wherein it is desired to read data or intelligence from discrete lines of the document D as illuminated by the incandescent lamp I the line resolution available for reading data from the document D is severely limited by the irregular non-linear light pattern of the filament image F'.

Referring now to FIG. 2, the light source I of FIG. 1 is replaced by the combination of an inexpensive, commercially available elongated cylindrical incandescent lamp 10 inserted within an elongated, cylindrical, tubular light reflecting means 20 which produces a uniform light pattern through a light diffuser strip window. The uniform light pattern corresponding to the window 22 is projected on to the document 30 by the lens 40. The field of view of a conventional optical reading machine or scanner 50 is synchronized with the uniform light pattern projected onto the document to enable the optical reading machine 50 to extract data or intelligence from the illuminated portion of the document 30.

The combination of the incandescent lamp 10 and a particular embodiment of the light reflecting means 20 is illustrated in detail in FIG. 3. The light reflecting means 20, as illustrated in FIG. 3, consists of a tubular glass member 24 having a light reflective coating 26 disposed on the inner surface area except for the surface area defined by the pattern area 28 which corresponds to window 22. While the pattern area 28 may be any desired pattern, a pattern area extending longitudinally along the length of the reflecting means 20 as illustrated, produces the line light pattern required in most optical reading and scanning applications. The external surface area of the tubular, cylindrical glass member 24 corresponding to the pattern area 28 is treated by a suitable process such as etching, sand blasting, etc. to produce a light diffuser 29.

Alternatively, as illustrated in FIG. 4A the reflective coating can be disposed on the external surface of the glass cylinder and the light diffuser disposed on the inside or outside surface of the glass cylinder.

A further alternative to implementing the light reflecting means 20 of FIG. 2 is illustrated in FIG. 4B wherein the tubular glass member 24 is replaced by a metal tube 60 having a polished surface 62 and a light diffuser window 64 positioned in the wall of the metal tube 60.

It has been determined experimentally, that the optical properties of the light reflective coating 26 of FIGS. 2, 3 and 4A and the polished surface 62 of FIG. 4B produces a virtual image of the actual filament F of the incandescent lamp I with axial symmetry within the lamp I. Both the actual and virtual filament images are projected onto the document 30 by the lens 40.

While the projection of both the actual and virtual filament images reduces the non-uniformity of the projected light pattern of the Prior Art, the addition of the light diffuser 29 to the window 22 causes the actual and virtual filament projection to produce a pattern of uniform light intensity corresponding to the pattern area 28.

Thus the combination of the light reflective coating, which results in the projection of both the actual and virtual images of the filament and the light diffuser 29 results in the focusing of a light pattern of uniform intensity corresponding to the pattern area 28 onto the document 30 by the lens 40.

While numerous lens configurations are available to implement the function of lens 40, it has been determined experimentally that the use of a cylindrical lens enhances the projection of a uniform light pattern when the pattern area 28 is essentially a line pattern area.

The selection of the reflective coating material or metal tube material in the above embodiments is determined by the wavelength of the light to be transmitted through the window 22. Thus the selection of an incandescent lamp dictates a coating material or metal tube material which will optimize the reflection of the near infrared.

While numerous suitable metallic coatings can be employed to effect the desired light reflection within the tubular light reflecting means 20, it has been determined experimentally that gold is particularly suited for the near infrared. If a highly reflective coating of gold is employed, the intensity of the virtual image of an incandescent lamp will be substantially equal to that of the actual filament image and thus the average light intensity developed is comparable to that produced by two incandescent lamps. This is of great significance inasmuch as the detection sensitivity and speed of the optical reading machine 50 is, to a significant degree, determined by the intensity of the light source illuminating the document.

While the optical reading system of FIG. 2 employs the combination of the lamp 10, light reflecting means 20 and lens 40 in a light reflective arrangement with the optical reading machine 50, the same elements are equally functional in a light transmission arrangement as illustrated in FIG. 5. In this embodiment the optical reading machine 50 responds to the pattern of light transmitted through the document 30 from the lamp 10.

What we claim is:

1. A light source apparatus, comprising,
   an elongated, tubular cylindrical light reflecting means having a light diffuser strip window extending parallel to the longitudinal axis of said elongated tubular cylindrical light reflecting means,
   an elongated cylindrical incandescent lamp positioned within said tubular cylindrical reflecting means, said incandescent lamp including a wire filament means extending between electrodes disposed at either end of said elongated cylindrical incandescent lamp, and electrical excitation means connected to the electrodes of said lamp, said elongated, tubular light reflecting means responding to the electrical excitation of said lamp by reflecting both the actual and virtual images of said wire filament through said light diffuser strip window, said light diffuser strip window projecting a pattern of uniform light intensity.

2. A light source apparatus as claimed in claim 1 wherein said elongated tubular cylindrical light reflecting means consists of an elongated cylindrical tubular glass member having a light reflective coating disposed on a surface thereof except for that portion of the surface corresponding to said light diffuser strip window.

3. A light source apparatus as claimed in claim 1 wherein said elongated tubular cylindrical light reflecting means is of a material exhibiting light reflection in the near infrared.

4. A light source apparatus as claimed in claim 3 wherein said material is gold.

5. A light source apparatus as claimed in claim 2 wherein said light reflective coating is a material exhibiting light reflection in the near infrared.

6. In an optical reading apparatus, the combination of,
   a line light source means for generating a line light pattern to illuminate a line portion of a document, and
   an optical reading means aligned to read information from the illuminated line portion of the document,
   said line light source means including an elongated tubular light reflecting means having an elongated line light diffuser strip window extending parallel to the longitudinal axis of said elongated tubular cylindrical light reflecting means, said light reflecting means being of a material exhibiting light reflecting characteristics in the near infrared, an elongated cylindrical incandescent lamp positioned within said elongated tubular cylindrical light reflecting means, said elongated cylindrical incandescent lamp including a wire filament extending between electrodes at either end of said incandescent lamp, and electrical excitation means connected to the electrodes of said incandescent lamp, said elongated tubular cylindrical light reflecting means responding to electrical excitation of said lamp by reflecting both the actual and virtual images of said wire filament through said line light diffuser strip window, said line light diffuser strip window transmitting a pattern of uniform light intensity to illuminate said line portion of said document.

7. In an optical reading apparatus as claimed in claim 6 further including a lens consisting of an elongated cylindrical rod positioned between said line light source means and said document to focus said light pattern onto said line portion of said document.

8. A linear light source apparatus as claimed in claim 6 wherein said elongated tubular cylindrical light reflecting means consists of an elongated cylindrical tubular glass member having a light reflective coating disposed on the external surface thereof except for that portion of the surface corresponding to said line light diffuser strip window.

9. A linear light source apparatus as claimed in claim 6 wherein said elongated tubular cylindrical light reflecting means consists of an elongated tubular cylindrical glass member having a light reflective coating disposed on the internal surface except for that portion of the surface corresponding to said line light diffuser strip window.

* * * * *